United States Patent [19]
Fouquer et al.

[11] Patent Number: 6,149,355
[45] Date of Patent: *Nov. 21, 2000

[54] BALL NOSE END MILL AND A CUTTING INSERT FOR THE BALL NOSE END MILL

[75] Inventors: Richard Fouquer, St. Cyr sur Loire; Patrick André, Luynes, both of France

[73] Assignee: Safety S.A., Boulogne-Billancourt Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,117

[22] Filed: Oct. 7, 1997

[30] Foreign Application Priority Data

Jul. 7, 1997 [FR] France .................................. 97 08576

[51] Int. Cl.$^7$ ...................................................... B23P 15/28
[52] U.S. Cl. .............................. 407/113; 407/35; 407/42; 407/65; 407/114
[58] Field of Search ................................ 407/33, 34, 42, 407/43, 44, 47, 48, 51, 53, 57, 60, 61, 64, 65, 101, 102, 103, 104, 113, 116, 78

[56] References Cited

U.S. PATENT DOCUMENTS

| | | | |
|---|---|---|---|
| 1,234,769 | 7/1917 | Kelly | 407/103 X |
| 2,289,344 | 7/1942 | Cedarleaf | 407/103 |
| 4,883,391 | 11/1989 | Tsujimura et al. | . |
| 4,898,499 | 2/1990 | Tsujimura et al. | 407/113 |
| 4,927,303 | 5/1990 | Tsujimura et al. | 407/54 |
| 5,197,831 | 3/1993 | Shiratori et al. | . |
| 5,221,162 | 6/1993 | Okawa | . |
| 5,294,219 | 3/1994 | Shiratori et al. | 407/34 |
| 5,486,073 | 1/1996 | Satran et al. | 407/113 |
| 5,593,255 | 1/1997 | Satran et al. | 407/113 |
| 5,622,460 | 4/1997 | Satran et al. | 407/42 |
| 5,951,213 | 9/1999 | Fauser et al. | 407/35 |

FOREIGN PATENT DOCUMENTS

| | | | |
|---|---|---|---|
| 5-67414 | 9/1993 | Japan | . |
| 2037629 | 7/1980 | United Kingdom | 407/103 |

OTHER PUBLICATIONS

5–Nouvelles concepttions de plaquettes en fraisage et tournage, par M. Fouquer (SAFETY)—(English—language translation of previously submitted document).

*Primary Examiner*—Henry W. H. Tsai
*Attorney, Agent, or Firm*—Burns, Doane, Swecker & Mathis, L.L.P.

[57] ABSTRACT

A ball nose end mill includes two identical cutting inserts which are clamped into two dissimilar insert seats. Each one of the two insert seats includes a narrower end and a wider end, the narrower end of one insert seat being located at the tip of the end mill, while the narrower end of the other insert seat is located at the end of the insert seat distal to the tip of the end mill. The inserts are correspondingly shaped with a wider end a narrower end, the ends being curved, and with rectilinear longitudinal sides. The inserts may be inclined axially negatively. The ball nose end mill permits two identical inserts to be used, permits large cutting depths to be obtained, and a negative axial inclination permits an impact point that is distanced from the tool tip.

7 Claims, 2 Drawing Sheets

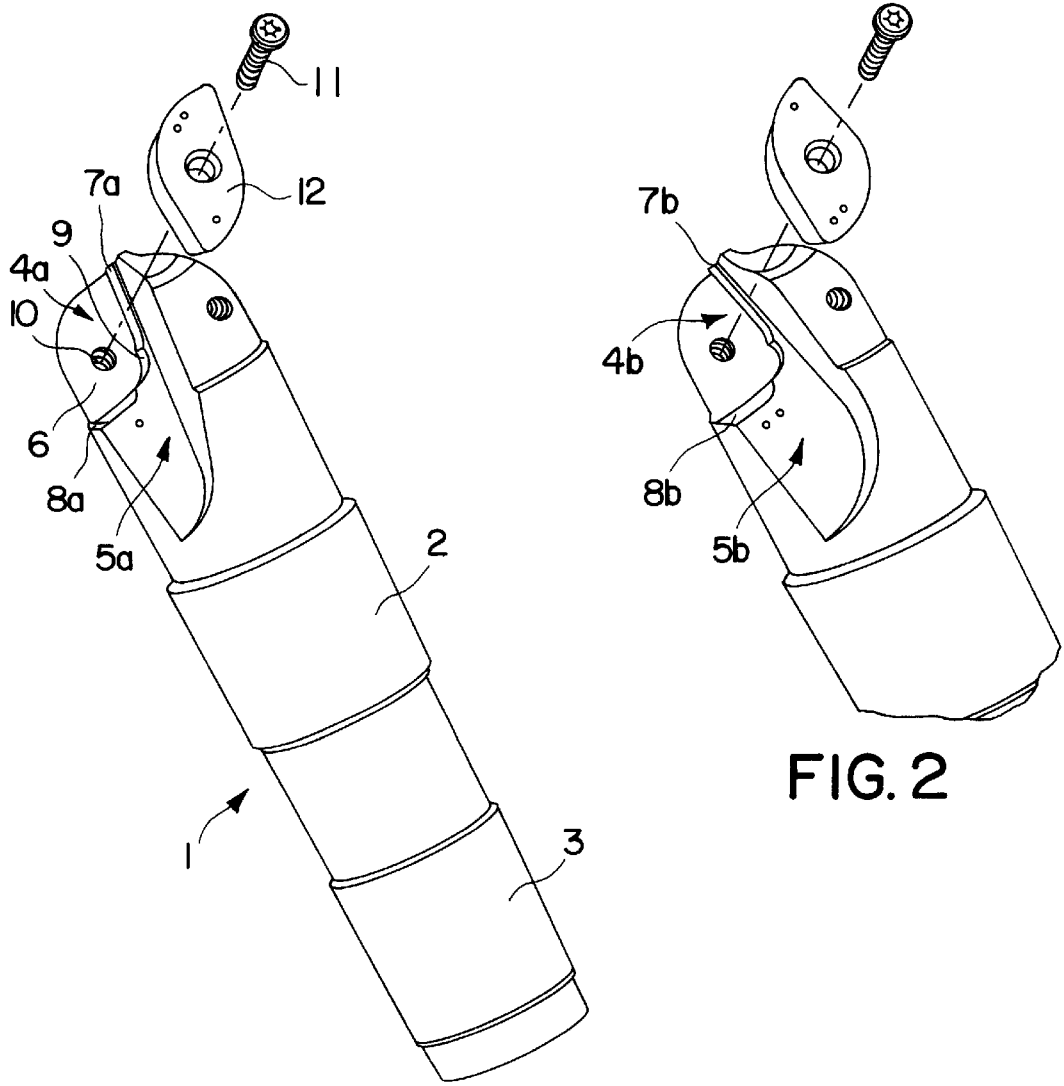
FIG. 1
FIG. 2
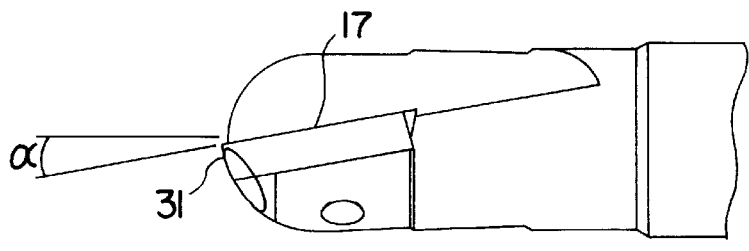
FIG. 3

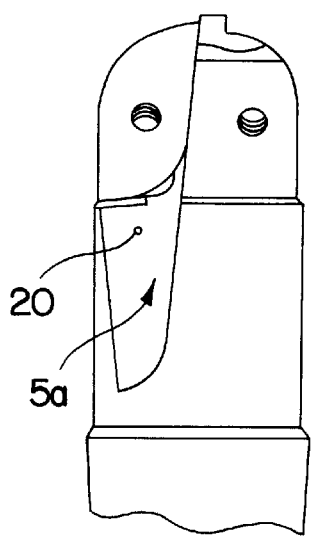
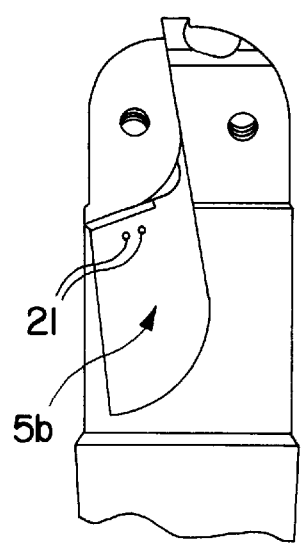
FIG.4  FIG.5
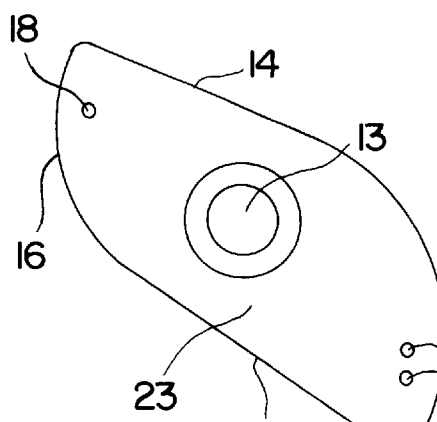
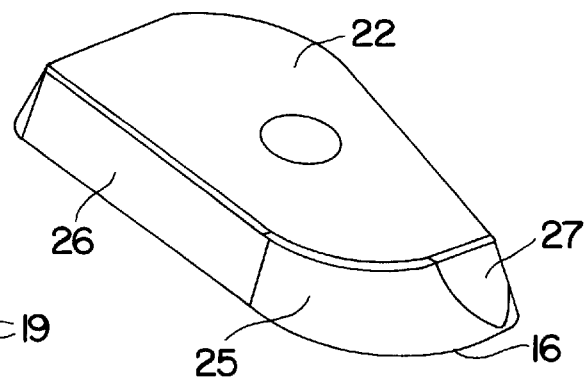
FIG.6  FIG.7
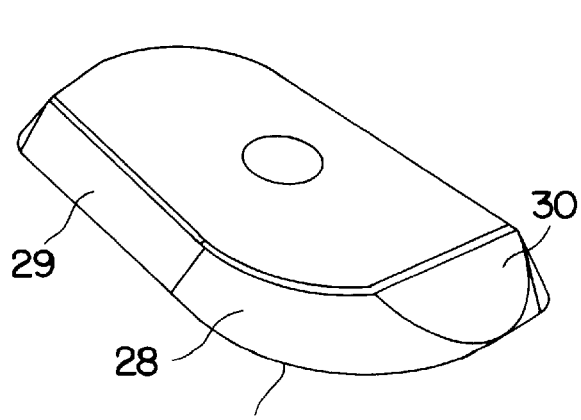
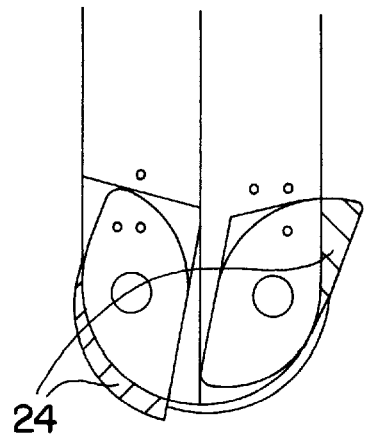
FIG.8  FIG.9

BALL NOSE END MILL AND A CUTTING INSERT FOR THE BALL NOSE END MILL

BACKGROUND AND SUMMARY OF THE INVENTION

The present invention relates to a ball end mill with two cutting inserts, and to these cutting inserts. In particular, the invention makes it possible to use two substantially identical cutting inserts in the two insert seats of the ball end mill, and to prevent the inserts from being fastened incorrectly in the insert seats.

Ball nose end mills are used in many metal working applications including mold making where the inherent strength and milling advantages of a fully radiused cutting edge for the copy milling of a mold cavity is best demonstrated. Its ball shape allows the end mill to attack the mold cavity from any angle or direction. The cutting edge when generated through the end of the ball mill becomes helical with rotation. This promotes shearing of the metal to be cut in an efficient manner.

A conventional ball nose end mill includes a generally cylindrical end mill body having a generally hemispherical forward end portion. Two insert-receiving seats or recesses are formed in the forward end portion, diametrically opposite to each other. Two indexable cutting inserts are mounted in the two seats and secured thereto by means of clamp screws. Such a ball nose end mill is disclosed in, for example U.S. Pat. No. 4,883,391 and U.S. Pat. No. 5,221,162. One disadvantage with these known end mills is that they necessitate two different types of cutting inserts. This fact increases of course the complexity of the tool and makes it more complicated to assemble for the operator. Moreover, it increases manufacturing and storage costs, since two different cutting inserts have to be produced and stored.

A ball nose end mill is disclosed in JP-U-5-67414 having two identical cutting inserts. These can be turned by 180° in the same insert seat, when one cutting edge has been worn out, and they may also be interchanged between the two seats. However, their cutting edges are entirely curved by a radius corresponding to the cutting radius of the tool. This gives the ball nose end mill a very limited cutting depth, which is unsatisfactory for many applications, such as for steep inclinations at die-making. In practice, the maximum possible cutting depth of this known toot equals its cutting radius. Another disadvantage of the entirely curved configuration of the inserts disclosed in JP-U-5-67414 is that the bearing side surfaces on the insert and in the seat are curved. This requires a very high degree of accuracy which is difficult and costly to obtain due to the required extensive grinding.

The cutting inserts of all the ball nose end mills according to the above acknowledged prior art have a positive axial inclination. It is true that this decreases the cutting forces, but on the other hand it further exposes the fragile front tip points of the inserts to the shock-like impact forces to which the inserts are submitted due to the fact that they operate intermittently. When the cutting inserts of a ball nose end mill has positive axial inclinations, the impact points will be at the front tips of the inserts.

Thus, the primary object of the present invention is to increase the possible cutting depth of a ball nose end mill, in comparison to the cutting depths achieved by the ball nose end mills of the prior art, while using two identical cutting inserts.

A further object of the present invention is to increase the resistance to impact forces on the cutting edges, in particular on the fragile tip portions of the cutting inserts.

Yet another object of the present invention is to overcome the problems with rounded bearing surfaces, while maintaining the basic concept of two substantially identical cutting inserts in the ball nose end mill.

According to one aspect of the present invention, a ball nose end mill includes a holder shaft having two dissimilar insert seats, and two substantially identical cutting inserts, each of the inserts being clampable in either one of the two dissimilar insert seats.

According to another aspect of the present invention, a holder shaft for a ball nose end mill includes two insert seats for carrying two substantially identical cutting inserts. Each of the two insert seats includes a first end and a second end, the first end being narrower than the second end, the first end of a first one of the two insert seats being disposed at a tip of the holder shaft, and the first end of a second one of the two insert seats being disposed at an end of the insert seat distal to the tip of the end mill.

According to yet another aspect of the present invention, a cutting insert for ball nose end mills includes a first and a second curved cutting edge and a first and a second substantially rectilinear cutting edge. The first curved cutting edge is shorter than the second curved cutting edge and the first substantially rectilinear cutting edge is shorter than the second substantially rectilinear cutting edge.

BRIEF DESCRIPTION OF THE DRAWINGS

For illustrative but non-limiting purposes, the invention will now be further described with reference to the appended drawings. These are herewith briefly presented:

FIG. 1 is an exploded perspective view of a ball nose end mill according to an embodiment of the present invention;

FIG. 2 is an exploded perspective view of a reverse side of the ball nose end mill of FIG. 1, with a major part of the shaft portion being broken away;

FIG. 3 is a side view of the ball nose end mill of FIGS. 1 and 2;

FIG. 4 is a side view of the ball nose end mill of FIGS. 1 and 2 taken at at another angle than the angle of FIG. 3;

FIG. 5 is another side view showing a reverse side of the ball nose end mill shown in FIG. 4;

FIG. 6 is a top view of a cutting insert according to an embodiment of the invention;

FIG. 7 is a perspective view of the bottom side of the cutting insert of FIG. 6.

FIG. 8 is a perspective view of the bottom side of the cutting insert as FIG. 6 taken at a different angle than the perspective view of FIG. 7.

FIG. 9 shows an embodiment of the ball nose end mill in which cutting inserts are erroneously clamped.

DETAILED DESCRIPTION

FIG. 1 shows generally a ball nose end mill consisting essentially of an insert-carrying holder shaft 1 and two cutting inserts 12, the latter being clamped to the holder shaft by two screws 11. The holder shaft has two smooth, slightly tapering surfaces 2 and 3 for clamping the tool in a rotating holder (not shown). However, the clamping arrangement is not an essential feature of the invention and tapering surfaces 2 and 3 may be replaced by any other suitable fastening configuration.

The top of the tool is shaped as a basically hemispherical surface intersectioned by two recesses, each one comprising an insert seat 4a, 4b and a chip pocket 5a, 5b. The insert seat 4a comprises a bottom support surface 6, a mainly axial side support surfaces 7 and a mainly radial support surface 8. Between said side support surfaces 7 and 8 is provided a free surface 9. A threaded hole 10 is provided in the center area of bottom support surface 6 for accommodating a clamping screw 11, by means of which the cutting insert 12 is clamped into insert seat 4a. The treaded holes 10 may be through holes or blind holes. In FIGS. 1, 2, 4 and 5 they are shown as through holes.

Geometrically, the insert seat 4b and clip pocket 5b are shaped differently than insert seat 4a and chip pocket 5a, but their constituent features are wholly analogous and self-explanatory in view of the above description of the recess comprising insert seat 4a and chip pocket 5a.

The geometrical shapes of the insert seats 4a and 4b correspond to the shape of cutting insert 12, as further explained with reference to FIGS. 6 to 8. As mentioned above, there are two identical cutting inserts in seats 4a and 4b, the differing feature being their orientation. Thus, as may be seen in FIG. 6, there is no line of symmetry across the center hole 13. The substantially straight edges 14 and 15 are not parallel, suitably they form an angle to each other of between 4 and 20°, preferably between 6 and 15°. These rectilinear cutting edges 14, 15 increase the possible cutting depth quite considerably, for instance by up to about 25%. This is of utmost importance for many operations at, e.g., die-making, and has not been achieved in prior art by two substantially identical cutting inserts. The radii of curvature of cutting edges 16 and 17 are substantially uniform and equal. Depending on the cutting diameter of the tool, this radius may be between, e.g., 5 mm and 20 mm. The curved cutting edge 16 corresponds to a circle sector of about 85 to 97° and cutting edge 17 corresponds to a circle sector of about 95 to 107°. In order to clearly distinguish between the two ends of the insert, one end is marked with a sole eye-mark 18 and the other end is marked with a double eye-mark 19. As may be seen in, e.g., FIG. 4 and 5, chip pocket 5a is provided with a sole eye-mark 20 and chip pocket 5b is provided with a double eye-mark 21. By means of these eye-marks, the risk of any erroneous location of a cutting insert is practically eliminated. In spite of all these precautions, if the cutting inserts were erroneously clamped, they would exhibit protruding zones 24, as illustrated in FIG. 9, which are very conspicuous to the operator and thus will alert him/her. Thus, the end of the cutting insert marked with two dots (19) shall face the chip pocket marked with two dots (21).

It is evident that the illustrated color dots 18–21 may be replaced by any other suitable marking means, such as other geometrical figures, letters, digits, etc, or by any patterns, notches, engravings, color markings, etc.

The shape of cutting insert 12 may be more clearly seen in FIGS. 7 and 8, which show perspective views of the bottom side of the insert, the two figures showing perspective views from opposite sides of the same insert. The side surfaces form an obtuse angle with the bottom side 22 and an acute angle with the top surface 23. The angle between the normal to bottom surface 22 and the side surfaces may suitably vary between +5 and +30°. The narrower end has a curved side surface 25 and adjacent to surface 25 is a substantially planar, in relation to the opposite side, longer side surface 26, which wholly or at least partly functions as an abutment surface against bearing surface 7a. Further, adjacent to the tip of the narrower end, there is provided a planar abutment surface 27, which abuts against bearing surface 8a. These two planar abutment surfaces are fully sufficient for a safe and stable positioning of the insert and there are no curved bearing surfaces. This simplifies the tool construction quite considerably.

Referring to FIG. 8, the wider end of the insert comprises a curved side surface 28 and adjacent to this side surface is a relatively shorter substantially planar side surface 29, which wholly or at least partly functions as an abutment surface that cooperates with bearing surface 7b in the insert seat. Furthermore, the curved surface 28 of the wider end transposes into a substantially planar abutment surface 30, which is intended to bear against bearing surface 8b. Again, the two planar abutment or bearing surfaces 29 and 30 are fully satisfactory for obtaining a safe and stable positioning of the insert, when it has been clamped by screw 11.

According to the illustrated embodiment, the top or chip surface 23 of the cutting insert is wholly planar. However, any suitable chip geometry may be conferred to the chip surface, as is well known in the prior art. Normally, the inserts are made of coated or uncoated cemented carbide and in this case these geometries are usually directly pressed and sintered. For instance, by designing a chip surface next to the cutting edge that slopes downwards towards the center of the insert, the cutting geometry can be rendered more positive, thus reducing cutting forces. One example of such a positive cutting geometry for ball nose end mills is disclosed in U.S. Pat. No. 5,197,831.

According to a preferred embodiment of the present invention, the axial angle of the cutting insert 12 is negative. This may be clearly seen in FIG. 3. This brings the advantage that the otherwise heavily exposed tip 31 does not have to endure the shock-like impact forces of an impact point. Instead of this, the impact point will be somewhere further up along the cutting edge 17. The axial angle $\alpha$ in FIG. 3 may suitably be between 3 and 20°, preferably between 6 and 14°.

While this invention has been illustrated and described in accordance with a preferred embodiment, it is recognized that variations and changes may be made therein without departing from the invention as set forth in the claims.

What is claimed is:

1. A cutting insert for ball nose end mills, the cutting insert comprising a first and a second curved cutting edge and a first and a second substantially rectilinear cutting edge, wherein the first curved cutting edge is shorter than the second curved cutting edge and the first substantially rectilinear cutting edge is shorter than the second substantially rectilinear cutting edge, and wherein, when viewed from along a central axis of the insert, the insert includes first and second non-identical halves, the first half including the first curved cutting edge and the first substantially rectilinear cutting edge and the second half including the second curved cutting edge and the second substantially rectilinear cutting edge.

2. The cutting insert according to claim 1, further comprising a top surface, a bottom surface, and side surfaces extending between the top surface and the bottom surface, the side surfaces including curved side surfaces disposed under the first and second curved cutting edges and at least one substantially planar abutment surface.

3. The cutting insert according to claim 2, wherein the first and second substantially rectilinear cutting edges are disposed opposite to each other and are connected to each other by the first and second curved cutting edges, the first and second curved cutting edges being disposed opposite to each other, the two substantially rectilinear cutting edges being non-parallel such that the insert includes a first end and a second end, the first end being narrower than the second end.

4. The cutting insert according to claim 3, wherein the first end and the second end include different identifying indicia.

5. The cutting insert according to claim 2, further comprising a positive cutting geometry on the top surface.

6. The cutting insert according to claim 1, wherein the first and second substantially rectilinear cutting edges are disposed opposite to each other and are connected to each other by the first and second curved cutting edges, the first and second curved cutting edges being disposed opposite to each other, the two substantially rectilinear cutting edges being non-parallel such that the insert includes a first end and a second end, the first end being narrower than the second end.

7. The cutting insert according to claim 6, wherein the first end and the second end include different identifying indicia.

* * * * *